United States Patent
Stoever

(10) Patent No.: US 7,036,272 B2
(45) Date of Patent: May 2, 2006

(54) PLANT CONTAINER

(76) Inventor: Hermann Stoever, Auf dem Dillen 11, Twistringen (DE) D-27239

( * ) Notice: Subject to any disclaimer, the term of this patent is extended or adjusted under 35 U.S.C. 154(b) by 100 days.

(21) Appl. No.: 10/415,779

(22) PCT Filed: Nov. 1, 2001

(86) PCT No.: PCT/DE01/04157

§ 371 (c)(1),
(2), (4) Date: May 1, 2003

(87) PCT Pub. No.: WO02/35914

PCT Pub. Date: May 10, 2002

(65) Prior Publication Data

US 2004/0025435 A1 Feb. 12, 2004

(30) Foreign Application Priority Data

Nov. 2, 2000 (DE) .......................... 200 19 124 U

(51) Int. Cl.
*A01G 9/02* (2006.01)
(52) U.S. Cl. ............................... 47/66.1; 47/9
(58) Field of Classification Search ................ 47/65.7, 47/66.3, 66.4, 65.5, 74, 73, 76, 78, 66.1, 47/9
See application file for complete search history.

(56) References Cited

U.S. PATENT DOCUMENTS

| 994,816 | A | * | 6/1911 | Cahill ............................ 47/74 |
| 1,532,325 | A | * | 4/1925 | Lee ............................. 156/91 |
| 1,994,553 | A | * | 3/1935 | Wolcott .......................... 47/74 |
| 2,094,513 | A | * | 9/1937 | Wilson et al. ................... 47/74 |
| 4,022,115 | A | * | 5/1977 | Greenwich ................... 493/175 |
| 4,287,840 | A | * | 9/1981 | Weidner ...................... 111/101 |
| 5,018,300 | A | * | 5/1991 | Chiu et al. ..................... 47/67 |
| 5,344,470 | A | * | 9/1994 | Molnar et al. .................. 47/58 |
| 5,544,447 | A | * | 8/1996 | Easey et al. .................. 47/65.5 |
| 2003/0041516 | A1 | * | 3/2003 | Cook .......................... 47/65.7 |

FOREIGN PATENT DOCUMENTS

| CH | 660942 | | 6/1987 |
| DE | 212729 | | 8/1982 |
| DE | 4009463 | | 9/1991 |
| DE | 4009463 A1 | * | 9/1991 |
| DE | 4234737 | | 5/1993 |
| DE | 4234737 A1 | * | 5/1993 |
| DE | 19532309 | | 3/1997 |
| DE | 20019124 | | 2/2001 |
| EP | 300578 A2 | * | 1/1989 |
| FR | 998720 | | 1/1952 |
| GB | 1357969 | | 6/1974 |
| GB | 2144015 A | * | 2/1985 |
| WO | WO00/32392 | | 6/2000 |

* cited by examiner

*Primary Examiner*—Peter M. Poon
*Assistant Examiner*—Timothy D. Collins
(74) *Attorney, Agent, or Firm*—W. F. Fasse; W. G. Fasse

(57) ABSTRACT

A plant container consisting of decayable and ecologically safe materials is collapsible and assembled from its parts consisting of a pre-cut casing (1) and a bottom (2) made of dimensionally stable wire mesh or biologically degradable plastic and a decayable organic material attached thereto. The plant container can be inexpensively transported and easily assembled just before it is put to use. It is permeable to water and air, prevents the accumulation of wetness, root rot and mildew, hinders the formation of spiraling roots and promotes a safe growth of the plant. The plant container is robust and dimensionally stable and therefore suited for use with planting machines.

11 Claims, 1 Drawing Sheet

PLANT CONTAINER

FIELD OF THE INVENTION

The invention relates to a plant container made of decayable and ecologically safe materials such as is used in the cultivation of young plants.

BACKGROUND INFORMATION

The German Utility Model Publication DE 82 12 729 U1 discloses a plant container for the cultivation of seedlings. The container can be produced from saturated bituminous paper by folding or joining together the parts of the container cut from a band or web of material. With this technical solution there is the disadvantage that such plant containers do not provide the stability required for the cultivation of larger seedlings and as a rule have to be removed prior to the transplanting. To the extent that known containers remain in the ground after planting, the bituminous paper makes it more difficult for the roots to grow through the casing and the bottom. In addition, bituminous paper is not ecologically safe.

A planting pot is known from DE 195 32 309 A1 that is formed from ring-shaped arched mats with overlapping zones in which the bottom is placed and which are made of a regenerative degradable organic fiber which is solidified with additives. According to this invention there is a support in the bottom made out of a ring-shaped mat ring casing of the planting pot in the inside bottom area. One or more bottoms may be placed on this ring and the overlappings of the ring casing are attached to this with backstitching.

While this planting pot has the advantage that it is made out of only degradable and insecticide-free material and is therefore ecologically safe, its use for cultivating larger seedlings is, however, limited, because the planting pot does not show the necessary stability to resist the high pressure incurred by the transport of larger tree-like plants that have been cultivated for longer periods. In addition, the transport and storage of these conventional planting pots is associated with significant costs.

SUMMARY OF THE INVENTION

An object of the invention is therefore to provide an improved plant container made of decayable and ecologically safe materials that is also suitable for the cultivation of larger, tree-like plants and that can be inexpensively stored and transported.

The above objects have been achieved according to the invention in a plant container comprising a bottom and a sidewall casing formed of plural mat elements that are flexibly connectable to each other, wherein each one of the mat elements respectively comprises a mat comprising a form-stable weave or grid of wires or biologically decayable plastic, first and second layers of at least one decayable organic material arranged respectively on opposite first and second sides of the form-stable weave or grid, and another layer of a bio-film, a fleece, or paper reinforced with natural fibers arranged between the form-stable weave or grid and one of the first and second layers.

The special advantage of the invention is that the plant container is collapsible and only needs to be set up on-site, immediately prior to use and that this can be done very easily.

This makes it possible to transport it inexpensively, for instance, on pallets, as well as an inexpensive storage of such plant containers. Furthermore, it is also suited for the cultivation of larger, tree-like plants. The weaving of wire or biologically degradable plastic makes it possible for the plant container to remain dimensionally stable for transportation even after longer periods of cultivation.

The invented plant container can also be planted with the plant in the soil after the plant has been cultivated.

The decayable material used and wire weave or biologically degradable plastic of the casing and bottom of the plant container guarantee the necessary stability and shape of the plant container for the cultivation period of the plant. It is permeable for both water and air. Even in regions with seasonally-based high volumes of precipitation, there will be no accumulated dampness and therefore no root rot or mildew.

The plant container also provides the advantage of undisturbed root penetration. It prevents the formation of spiraling roots and promotes a safe growth of the plant at the intended site.

The formation of spiraling roots has always been a special problem at nurseries. Such roots grow in circles along the wall of the plant container. Quite often plants at nurseries stand in planting pots for longer periods and thereby form a thick tangle of spiraled roots. If this tangle is not untangled when the plant is transplanted, the spiraling roots are disadvantageous to growth and the stability of the trees or larger bushes.

With the invented planter container the root system is able to develop in the ground without any disruption. Trees and larger bushes demonstrate a relatively good stability even after a short time and are resistant to the influence of the wind. It is not necessary to put holes in the walls of the plant container, as is currently state of the art with plant containers, to eliminate the formation of spiraling roots. The decay begins at the proper time with the invented plant container, when it is placed in the ground. The dimensional stability and stability of the invented plant container also makes it possible to transplant in the first 1 to 2 years if necessary.

When trees or larger bushes stand in a nursery for longer periods of time, the invented plant container, with its walls of decavable material, also acts against the damaging effect of intensive sunshine and against the drying influence of wind.

In addition, plants in the invented plant containers that have longer standing times in nurseries can be transplanted to larger plant containers without any problem without having to remove the previous plants. Even more importantly the plants gain even more stability through the transplanting.

BRIEF DESCRIPTION OF THE DRAWINGS

In the following the invented plant container should be explained in detail on the basis of drawings.

DETAILED DESCRIPTION OF A PREFERRED EXAMPLE EMBODIMENT AND OF THE BEST MODE OF THE INVENTION

Figure 1:
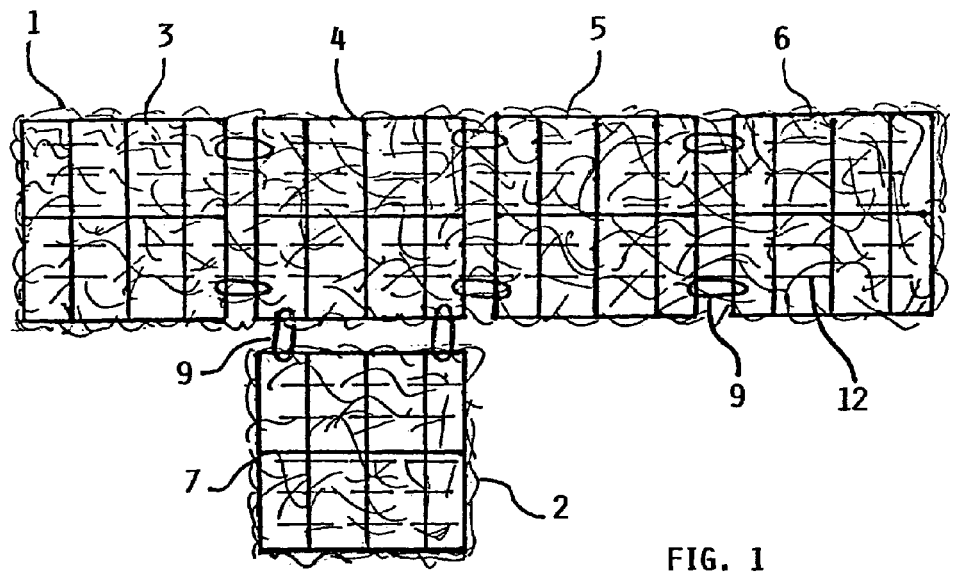
FIG. 1 The plant container in unfolded and connectible form.

FIG. 1 shows a plant container in the unfolded form with the casing 1 and the bottom 2 in the manner of pre-cut pieces. The casing 1 and the bottom 2 of wire mesh or biologically degradable plastic are formed in this design from the rectangular elements 3, 4, 5, 6 and 7 of the wire mats, which are connected to one another in a flexible manner by means of the connecting elements 9.

In this unfolded form it is inexpensive to transport and store the plant container and easily assemble it together on site. With easily obtained materials such as hooks and s-shaped clamps the ends of the casing 1 are mechanically connected to one another and the bottom 2 attached to casing 1.

To assure the required solidity and stability of the plant container for the weight and the pressure to be borne, the diameter of the wire and the width of the mesh of the wire mat 8 will be dimensioned in accordance with the intended size of the plant container.

Figure 2:
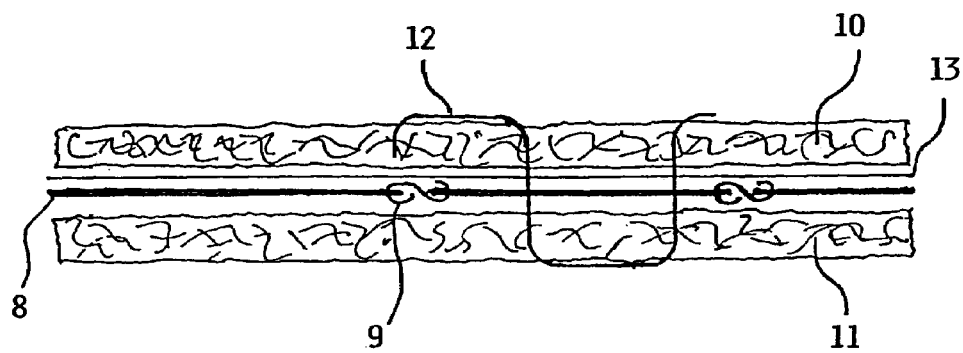
FIG. 2 The cross-section of a stabilized casing of the plant container

In the example embodiment shown in FIG. 2, the wire mat 8 is covered with coconut matting 10, 11 on both sides. As can be seen in this figure, the coconut mats 10, 11 are attached to the wire mat 8 by means of backstitching 12 out of decayable material, preferably jute or cotton. Instead of coconut mats 10, 11 another decayable material may be used, such as excelsior, a mixture of cellulose and fabric or jute. The coconut mats 10, 11 may also be attached to the wire mat 8 by interneedling, with nails, glue or clamps.

To assure that the moisture, especially in the summer period, is held in the plant container during the cultivation period, it is possible to place a bio-film 13 or a fleece, a layer of paper stabilized with natural fiber or a woven web of decayable material between the wire mat 8 and one of the coconut mats 10, 11, in this case coconut mat 10 as shown in FIG. 2. The use of a fleece also has the advantage that in the pre-cultivation, the energy-rich main roots of the plant can initially penetrate the fleece without difficulty and as a result of the restriction caused by the fleece many new roots can be formed that are important for the subsequent transplantation. The compact mesh of roots formed in this manner quickly provides the plant with the necessary hold after inserting the plant container in the ground, it aids in the uptake of nutrients and therefore reduces the loss by transplanting.

The casing 1 and the bottom 2 of the plant container are light and inexpensively produced. The dimensionally stable weave or grid mat 8 formed of the elements 3, 4, 5 and 6 made of wire or biologically degradable plastic is placed on a coconut mat 10 that is slightly pressed in the manufacturing process, and then in turn is covered with a slightly pressed coconut mat 11.

By means of backstitching 12 along the length, the mats 10, 11 are attached to the wire mat 8 and are then separated from the coconut mat web according to the intended dimensions of the casing 1. The separation can also be carried out in such a manner that a part of the coconut mat 10, 11 extends beyond the wire mat 8 so that the casing 1 can be joined by overlapping when the plant container is assembled on site. The coconut mat extending beyond the upper edge of the casing 1 can be folded inward and cover the wall of the casing.

The bottom 2 of the plant container is assembled in the same manner and can be shaped in a variety of ways. It can be circular, elliptical or multi-cornered. The casing 1 can be shaped to match the bottom 2. With a round bottom it is bent in a ring if the plant container is to be conical-shaped. In a multi-cornered bottom shape the casing will have a corresponding rectangular shape whereby the elements of the wire mat 8 of the casing 1 will be executed to match with the element of the wire mat in the bottom 2.

The invented plant container is characterized by its robustness and stability. It is therefore also suited for planting machines and devices and forklifts. It is therefore a very effective tool for conserving working processes, especially in nurseries.

LIST OF DRAWING REFERENCES

1. Casing
2. Bottom
3. Wire mat 8 element
4. Wire mat 8 element
5. Wire mat 8 element
6. Wire mat 8 element
7. Wire mat 8 element
8. Wire mat
9. Connector
10. Coconut mat
11. Coconut mat
12. Backstitch
13. Bio-foil

The invention claimed is:

1. A upright plant container comprising a bottom and a sidewall casing formed of plural mat elements that are flexibly connectable to each other, wherein each one of said mat elements respectively comprises a mat comprising:
   a form-stable weave or grid, said weave or grid comprising wires or biologically decayable plastic,
   first and second layers of at least one decayable organic material arranged respectively on opposite first and second sides of said form-stable weave or grid, and
   another layer of a bio-film, a fleece, or paper reinforced with natural fibers arranged between said form-stable weave or grid and one of said first and second layers,
   and wherein said plant container further comprises hooks or S-shaped clamps for flexibly connecting said mat elements of said bottom and of said sidewall casing to one another and for flexibly connecting opposite ends of one or more of said mat elements of said sidewall casing to one another to assemble and erect said plant container.

2. The plant container according to claim 1, wherein said first and second layers of decayable organic material are secured to said form-stable weave or grid by backstitching or interneedling.

3. The plant container according to claim 1, wherein said first and second layers of decayable organic material are secured to said form-stable weave or grid by nailing or stapling.

4. The plant container according to claim 1, wherein said first and second layers of decayable organic material are secured to said form-stable weave or grid by gluing.

5. The plant container according to claim 1, wherein said organic material comprises coir or coconut fiber.

6. The plant container according to claim 1, wherein said organic material comprises excelsior or wood shavings.

7. The plant container according to claim 1, wherein said organic material comprises a mixture of cellulose wood pulp and textile fibers.

8. The plant container according to claim 1, in a collapsed flat configuration in which not all of said mat elements are completely connected to each other.

9. The plant container according to claim 8, wherein said mat elements of said sidewall casing and of said bottom all lie flat on a common single plane.

10. The plant container according to claim 9, wherein each one of said mat elements is flexibly connected to at least one adjacent one of said mat elements.

11. The plant container according to claim 1, in a three-dimensionally assembled configuration forming a three-dimensional shape of said plant container bounding an interior container volume above said bottom and surrounded by said sidewall casing.

* * * * *

UNITED STATES PATENT AND TRADEMARK OFFICE
CERTIFICATE OF CORRECTION

| | | |
|---|---|---|
| PATENT NO. | : 7,036,272 B2 | Page 1 of 1 |
| APPLICATION NO. | : 10/415779 | |
| DATED | : May 2, 2006 | |
| INVENTOR(S) | : Stoever | |

It is certified that error appears in the above-identified patent and that said Letters Patent is hereby corrected as shown below:

On the cover page, in "[*] Notice: Subject to any disclaimer, the term of this patent is extended or adjusted under 35 USC 154(b) by 100 days", delete the phrase "by 100 days" and insert --by 36 days--.

Signed and Sealed this

Fourth Day of September, 2007

JON W. DUDAS
*Director of the United States Patent and Trademark Office*